June 11, 1957  E. S. COBB ET AL  2,795,523
METHOD OF REPAIRING AUTOMOBILE SHEET METAL PANELS
Filed Nov. 22, 1954  2 Sheets-Sheet 1
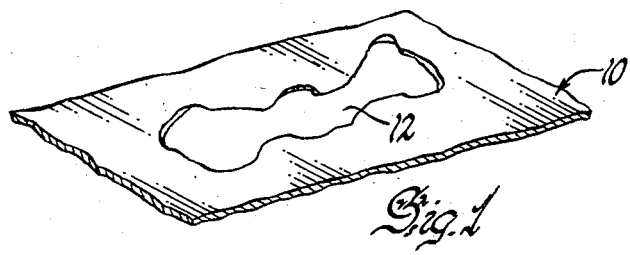
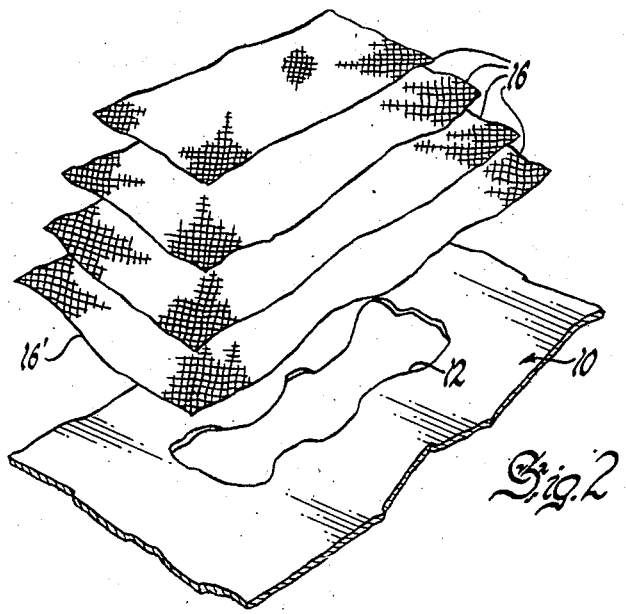
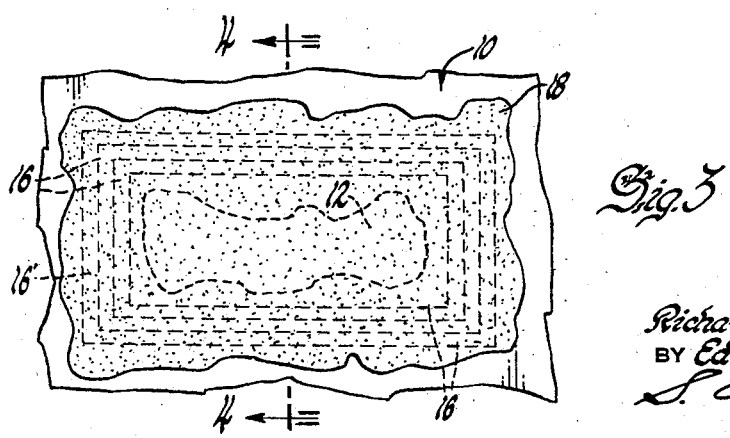
INVENTORS
Richard F. Burdette &
BY Edwin S. Cobb
J. E. Roos
ATTORNEY

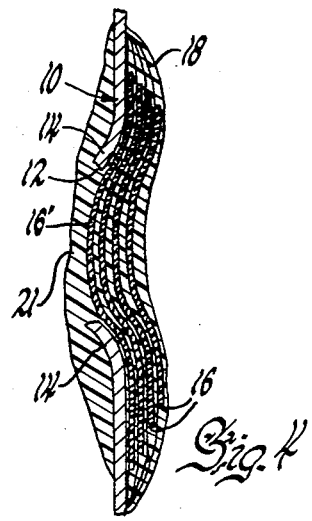
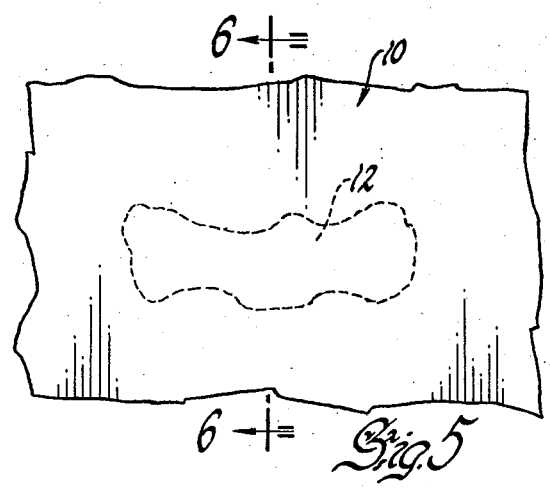
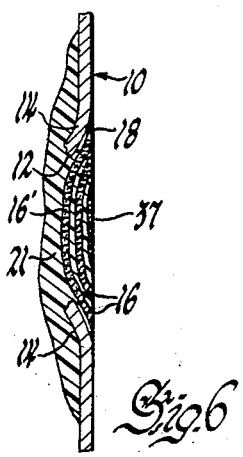
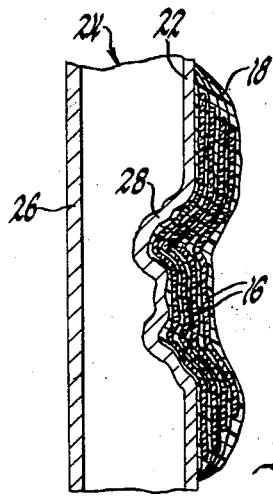
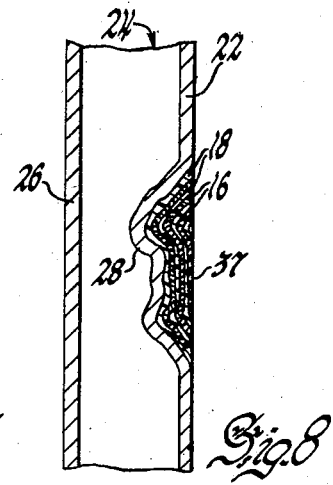
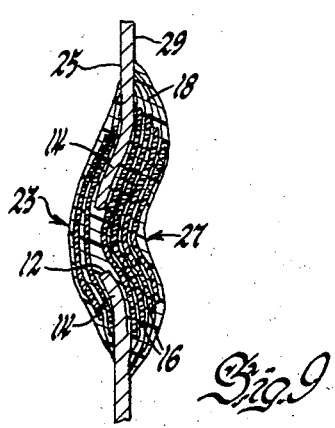

United States Patent Office 2,795,523
Patented June 11, 1957

2,795,523

METHOD OF REPAIRING AUTOMOBILE SHEET METAL PANELS

Edwin S. Cobb, Birmingham, and Richard F. Burdette, Hazel Park, Mich., assignors to General Motors Corporation, Detroit, Mich., a corporation of Delaware Application November 22, 1954, Serial No. 470,255

5 Claims. (Cl. 154—104)

This invention relates to a method of repairing sheet metal panels and more particularly to a process for repairing the steel panels of automobile or truck bodies by means of epoxy resin reinforced with glass fibers.

The repair of sheet metal panels of automobile bodies, fenders, doors, hoods, trunk lids, etc., by conventional methods is a relatively expensive procedure. For example, in repairing a typical sheet steel panel of an automobile approximately 80% of the cost can be attributed to labor charges. Hence any process for repairing holes or dents in such panels which reduces the labor time involved in such repairs can result in very substantial savings by the automobile driving public.

Therefore, a principal object of the present invention is to provide a novel method of repairing sheet metal panels of automobiles and the like which appreciably reduces the labor and repair time involved in conventional methods of repairing such parts. A further object of this invention is to provide a rapid, simple and inexpensive process for repairing automobile sheet steel panels by the use of epoxy resin, thereby substantially decreasing the cost of both materials and labor as compared with methods of repair heretofore used. A still further object of the invention is to provide a method of repairing automobile panels which results in a repaired part which is equal or superior in strength, durability and appearance to the product obtained by conventional methods of repair.

These and other objects are attained in accordance with the present invention by a process for repairing sheet metal panels, particularly sheet steel panels of automobile bodies, involving the application of liquid epoxy resin to the area to be repaired. The epoxy resin is reinforced with glass fibers to provide the final product with greater strength and ductility. Fiber glass cloth is preferably employed to provide the necessary high strength and smooth surface to the repaired part. However, fiber glass mats or strands may also be included in the mix or introduced into the hole or dent to be repaired so as to act as a filler. Upon setting of the epoxy resin, the fiber glass-reinforced resin in the patched area may be ground to conform to the contour of the sheet metal panel being repaired.

The use of epoxy resins to repair sheet metal panels of automobile bodies in the manner hereinafter described provides outstanding results for several reasons. Not only do epoxy resins adhere readily and strongly to sheet steel, but these resins are very hard when set and possess extremely low shrinkage rates, typically in the order of only 2%. The resultant fiber glass-reinforced epoxy resin patch satisfactorily withstands extreme temperature conditions, such as those ranging from minus 50° F. to plus 150° F. Moreover, the method of repairing automobile bodies in accordance with this invention can be mastered in a short time by semi-skilled personnel.

An important application for this invention is the repair of rusted out body panels where heat from a torch is dangerous or damaging or where conventional methods of repair necessitate the removal and replacement of interior trim.

Other objects and advantages of the present invention will more fully appear from the following detailed detailed description of preferred embodiments of the invention, reference being made to the accompanying drawings, in which:

Figure 1 is a fragmentary, perspective view of a sheet metal panel having a hole to be repaired in accordance with the invention;

Figure 2 is a fragmentary, exploded view of the sheet metal panel shown in Figure 1 and the relative positions of successively applied layers of fiber glass cloth used to repair the hole in the panel;

Figure 3 is a plan view, with parts broken away, of the sheet metal panel shown in Figures 1 and 2 after application of the fiber glass cloth layers and epoxy resin but prior to finishing operations;

Figure 4 is an enlarged sectional view along the line 4—4 of Figure 3;

Figure 5 is a plan view of the repaired sheet metal panel shown in Figure 4 after the excess epoxy resin and fiber glass cloth have been removed;

Figure 6 is an enlarged sectional view along the line 6—6 of Figure 5;

Figure 7 is a fragmentary sectional view of a dented sheet metal panel, showing the location of layers of fiber glass cloth and resin used to repair the panel;

Figure 8 is a fragmentary sectional view of the panel and reinforced-resin patch shown in Figure 7 after the excess epoxy resin and fiber glass cloth have been removed;

Figure 9 is a fragmentary sectional view of a sheet metal panel, showing the location of fiber glass cloth layers and epoxy resin which have been applied to both sides of the panel; and Figure 10 is a fragmentary sectional view of a severely rusted sheet metal panel, showing the intentional provision of holes for securely anchoring the fiber glass-reinforced epoxy resin patch.

Referring more particularly to the drawings, in Figure 1 is shown a sheet metal panel, indicated generally by 10, such as those used in automobile bodies, fenders, doors and the like. This panel has a hole 12 to be repaired in accordance with the present invention.

Before application of the epoxy resin and the glass fiber reinforcing material in the manner hereinafter described, the surfaces of the part to be repaired are preferably thoroughly cleaned. All dirt, wax, road scum and the like should be removed, preferably by the application of a hydrocarbon type of solvent to the entire metal surfaces to be refinished. Whenever possible, paint and rust scale surrounding the hole or dent to be repaired also should be removed. A disc sander may be employed for this purpose, the sheet metal preferably being sanded six to eight inches beyond the area of intended repair. It should be noted, however, that if the area to be repaired is severely rusted and it is impractical to sand this area because of its location or other reasons, it is not necessary to remove all the rust. Only the easily detachable scale need be removed since good adhesion between the epoxy resin and the sheet metal can be obtained even in the presence of rust. In some instances, however, it may be desirable to punch or otherwise form holes in the metal surrounding the rusted area to insure an extremely strong bond between the plastic and the sheet metal. These holes permit the plastic "patch" area to become securely bonded to a severely rusted panel.

After the aforementioned cleaning process, the sheet metal immediately surrounding the hole 12 is preferably indented or recessed below the original contour of the panel, as shown at 14 in Figures 4 and 6, so as to provide more secure bonding of the epoxy resin to the metal and to permit the proper contouring of the resultant patch. This indentation of the sheet metal may be conveniently accomplished with a bumping hammer and, if the back side is accessible, a dolly block may also be employed. It is desirable to recess the sheet metal as far beyond the actual rusted or torn area as is necessary to permit proper filling and bridging of the hole.

Since moisture has a detrimental affect on the curing of epoxy resins, an effective bond between the epoxy resin and the sheet metal can be obtained only if any moisture on the surface to be repaired is first removed. This can be done conveniently by the application of heat so as to evaporate moisture and eliminate any dampness. In most body repair shops infra-red lamps may be conveniently employed for this purpose.

A predetermined number of fiber glass cloth patches 16 are then cut to proper size which permits their completely covering the hole 12. Two or more layers of this cloth should be used. It is advisable to cut the cloth patches so that the largest of these patches is of sufficient size to overlap the sheet metal adjacent the damaged area for approximately three to four inches. Of course, the fiber glass cloth should be clean and dry at all times since moisture in the cloth will retard curing of the resin. In some instances it may be desirable to apply a multiplicity of smaller size fiber glass cloth patches over the area to be repaired rather than a lesser number of larger patches. A desirable arrangement is shown in the exploded view of Figure 2 wherein the fiber glass cloth layers 16, as applied to the sheet metal panel, are of successively decreasing size. Inasmuch as the sheet metal adjacent the hole 12 is preferably indented at 14, this arrangement, in which the largest fiber glass cloth patch is first applied and the subsequent patches are of gradually decreasing size, permits efficient build-up of the resin-glass fiber patch.

When the hole or dent to be repaired has been prepared in the foregoing manner and the fiber glass cloth layers have been cut to proper sizes and shapes, the liquid epoxy resin is mixed with a suitable hardener or hardeners in an appropriate container. Since the chemical reaction begins upon the mixing of the hardener or catalyst with the resin, the mixture should be used immediately thereafter. Occasional stirring of the catalyzed resin prolongs its working life or "pot life" by lessening the chemical heat concentration resulting from the exothermic reaction. The typical and most useful mixtures of epoxy resins and hardener agents have a "working time" in the container of approximately only 15 minutes. Inasmuch as this material is set or hardened after this period of time, only an amount of epoxy resin and hardener should be mixed which is to be immediately used.

After the catalyzed resin (hereinafter referred to only by the term "resin") has been prepared, a thin coat of the resin is applied to the sheet metal surface surrounding the hole to be repaired, as indicated at 18 in Figure 3. The resin may be applied and spread evenly over this surface by means of a mixing stick or paddle, brush, spraying equipment or other appropriate means. The first fiber glass cloth patch or layer, such as the largest layer 16' shown in Figures 2, 3, 4 and 6, is then applied over the hole and pressed firmly against the liquid resin in the area surrounding the hole 12. All wrinkles and air bubbles in the fiber glass cloth should be removed by smoothing out the cloth with a paddle or other suitable means. Next a second coat of resin is applied over the fiber glass cloth layer 20, thereby completely saturating this cloth with the resin. If the area under repair is very large, it may be advantageous to saturate the fiber glass cloth with resin before it is applied to the sheet metal. The above-described steps of successively applying liquid epoxy resin and layers of fiber glass cloth are thereafter repeated as many times as are necessary to obtain the desired thickness of the fiber glass-reinforced epoxy resin patch. Figures 3 and 4 illustrate a patch which has been built up in this manner.

In order that the patch area will have a finish surface conforming to the contour of the surrounding panel area, it is desirable that the final build-up of the resin and fiber glass cloth be above the contour of the panel. This build-up relative to the contour of the sheet metal panel is shown in Figure 4, for example. The thicknesses of the sheet metal and the fiber glass cloth layers are exaggerated in the drawings so as to better illustrate the relationship of these parts. Normally a completed patch having five layers of fiber glass cloth will have a thickness of only approximately $\frac{1}{10}$ inch before the grinding operation hereinafter described. It also will be understood that, unlike the patches shown in the drawings, the fiber glass cloth patches will not be separated by measurable layers of epoxy resin, the sectional views in the drawings serving principally to illustrate the successive application of the resin and fiber glass cloth layers.

In many instances it is advantageous to cover the repaired area with cellophane paper or the like while the resin is setting. This covering will adhere to the sticky epoxy resin, although occasionally it may be desirable to hold the covering in place until the resin gels. A water-impermeable sheet of cellophane or the like prevents outside moisture from contacting the hardening resin and aids in retaining the patch in position until the resin sets.

As soon as the final layup is completed in the foregoing manner, hardening or setting of the epoxy resin may be expedited by applying heat to the repaired area. This may be conveniently and rapidly done by means of infrared lamps. Under these circumstances, if the patching material has been properly prepared, setting of the resin usually occurs in approximately 10 minutes or less, depending somewhat upon the thickness of the patch. When the epoxy resin reaches the gel stage, excess patching material which can readily be trimmed off by means of a knife or the like may be removed.

When the epoxy resin has set or hardened to a sufficient extent, the fiber glass-reinforced epoxy resin patch may be finished so as to conform to the contour of the sheet metal panel being repaired. Merely scratching the surface of the epoxy resin with a fingernail or other convenient object affords a simple and expeditious method of determining when the resin has sufficiently set. When the surface of the resin no longer can be easily scratched, a power grinder may be used to cut the repaired area to the appropriate contour. The final contouring may be effected by hand filing operations or by other appropriate means. In this manner the outer surface 37 of the patch can be made flush with the outer surface of the sheet metal panel 10, as shown in Figure 6. A finishing operation with sand paper or emery cloth, using the same procedure as with metal repair, may then be used.

After the fiber glass-reinforced epoxy resin patch has been contoured to shape, the repaired area can be refinished in the same manner as sheet metal repaired by conventional methods. Hence, a cleaner, primer surfacer, glaze putty and color coats may be applied over the plastic as effectively as if it were sheet metal.

The above-described procedure is normally employed where access to the back of the panel being repaired is impractical. However, in the event the rear surface of the panel is readily accessible, a reinforcing layup may be used on this surface. An example of this type of panel repair is shown in Figure 9. Inasmuch as a fiber glass-reinforced epoxy resin patch 23 applied to this back surface 25 bonds with the patch 27 on the front surface 29 of the panel, the composite patch is very strong and securely bonded to the sheet metal. Even when this latter method of repair is employed, fewer layers of fiber glass cloth 16 usually are used on the rear surface of the panel than on its front surface because automobile panels are principally subjected to forces applied to their outer surfaces.

In any event, whenever possible excess epoxy resin should be applied to the back surface of the panel, as indicated at 21 in Figures 4 and 6. Obviously such a resin layer at the rear of the panel is bonded to both the fiber glass cloth on the front of the panel and the back surface of the panel itself, thereby further anchoring the resultant patch.

Also it is occasionally desirable to use chopped fiber glass impregnated with epoxy resin as a filler before the finish patch is formed. If there is a large unsupported area to be repaired where a back-up is necessary, other filler materials can be forced into the hole to provide a temporary rough contour. Crushed or crumpled paper may be conveniently and inexpensively used for this purpose, thereby functioning as a backing surface to retain in proper position the first layer of fiber glass cloth which is applied to the surface of the panel under repair. If desired, the wadded paper can be removed after the epoxy resin has set.

Referring now to Figure 10, where only limited bonding of the epoxy resin to the sheet metal panel can otherwise be obtained due to the severely rusted out condition of the metal, a series of small holes or tears 31 can be provided in the panel adjacent the rusted area 33. The liquid resin, when applied to the front surface 29' of the panel, will flow through the holes 31 and spread radially outwardly from these holes behind the panel, as indicated at 35. Upon setting of the epoxy resin, it becomes strongly bonded to the back surface 25' of the sheet metal panel as well as to the front surface thereof. Hence, the holes or tears 31 provide a buttoning or anchoring affect which aids in securely retaining the glass-fiber reinforced epoxy resin patch in position on the badly rusted sheet metal.

Although the panel 10 is shown as having a hole 12 extending therethrough, the present invention is equally applicable to repairing dents in sheet metal panels by the application of epoxy resin and glass fibers in the above-described manner. Hence the word "hole," as used herein, is intended to include both recesses and apertures. When dents are to be repaired, the combination of epoxy resin and glass fibers acts as a filler for the recess or dent in the panel to thereby make the surface of the dent area properly conform to the contour of the panel being repaired.

An example of a sheet steel automobile panel having a dent which may be repaired in accordance with the invention is shown in Figure 7. In this modification of the invention the panel 22 is shown as part of a double-walled structure indicated generally by 24, such as a door or the like. Under these conditions wherein the other panel 26 prevents convenient access to the rear surface of the panel 22 to be repaired, it is considerably simpler and less expensive to repair the dent 28 in accordance with the present invention than to remove the panel 26 and bump out this dent.

In repairing such dents the procedure hereinbefore described in conjunction with the repair of apertures is generally followed. That is, the epoxy resin 18 and the plurality of layers of fiber glass cloth 16 are successively applied in the above-described manner. After the epoxy resin has set, the excess resin and glass fibers on the front surface of the panel are removed by a grinding operation or other suitable means so that the finished surface of the patch conforms to the desired contour of the repaired panel. It will be obvious, therefore, that if the dent in the panel has caused adjacent sheet metal areas to extend outwardly beyond the normal contour of the panel, these protuberances should be eliminated by means of a bumping hammer or otherwise before application of the epoxy resin and fiber glass cloth.

Low cost practical repairs to automotive sheet metal may be effected, therefore, by employing a mixture of one or more epoxy resins and a suitable catalyst or hardener in conjunction with fiber glass cloth. Various monomeric, low molecular weight diepoxides may be used as the principal epoxy resin constituents. Among the epoxy resins which are appropriate are rigid, room-temperature hardening, thermosetting resins with 100% reactive components when formulated with their complementary hardeners. Examples of appropriate epoxy resins are those identified as resin No. BR–18774 and resin No. BR–18795 currently being manufactured and sold by Bakelite Company, a division of Union Carbide and Carbon Corporation. These diepoxides are reaction products of bis-phenol A ($C_6H_4OHC(CH_3)_2 C_6H_4OH$ or dimethyl dipara bis-phenol methane) and epichloro hydrin, the resultant product being polyglycidyl ether of bis-phenol A.

Typical hardeners which may be successfully employed are aliphatic polyamines which are especially synthesized to give the aforementioned epoxides a wide range of curing speeds, viscosity and pot life. Among the suitable polyamines are ethylene diamine, diethylene triamine, triethylene tetramine, etc. These and various other hardeners also may be blended to obtain specific properties in the finished product. Examples of such hardener blends are those identified as BR–18793 and BR–18807 currently manufactured and sold by Bakelite Company.

A particularly effective mixture of the aforementioned resins is a mixture of three parts by volume of Bakelite resin No. BR–18795 and two parts by volume of Bakelite resin No. BR–18774. Satisfactory results have been obtained when one part of catalyst is added to four parts by volume of resin or resin mixture.

Standard grades of fiber glass cloth may be used. The cloth identified in the trade as #1500 is highly satisfactory because of its wetting ability with epoxy resin and its strength in the finished patch. Also chopped glass fibers may be advantageously used in repairing sheet metal panels in accordance with the present invention. These fibers are preferably mixed with the prepared resin before application to the panel and thus serve as a filler material. This type of filler is particularly desirable where dents of any substantial depth are being repaired.

By the use of the foregoing process it has been found that the cost of repairing a sheet steel panel of an automobile body may be reduced approximately 70% as compared with methods of repair heretofore normally used. For example, the cost of materials necessary to repair a typical automobile door panel by means of the subject invention is less than ¼ the material cost involved in repairing the same panel by conventional procedures, such as by the use of solder welding, lead patching, etc. Likewise, only approximately ⅓ as much labor time is required to patch a steel automobile panel by the technique hereinbefore described as compared with conventional methods.

Moreover, the economic advantages of the present invention are even greater when the automobile panels being repaired are so located that the use of a blowtorch normally would further appreciably increase the cost of repair. For example, in some instances the conventional torch repair method necessitates the removal and replacement of interior trim which has been damaged by the heat from the torch. In other instances the use of a torch distorts sheet metal and necessitates subsequent corrections. The epoxy resin-fiber glass cloth method of repair hereinbefore described eliminates these sources of additional expense. Also, the present invention may be advantageously applied to the repair of gasoline tanks. It not only eliminates the danger due to torch soldering, but it reduces labor costs since the gasoline tank does not have to be removed in order to be repaired.

As hereinbefore indicated, the present method of repairing dents or holes in the sheet metal panels of automobiles is applicable to the repair of automobile bodies, fenders, doors, hoods, trunk lids, etc. For purposes of simplification, however, the term "automobile body," as used herein, is intended to encompass all of the aforementioned types of automobile or truck sheet metal panels whether or not these particular panels are normally designated as portions of an automobile body.

While this invention has been described by means of certain specific examples, it will be understood that the scope of the invention is not to be limited thereby except as defined in the following claims.

We claim:

1. A method of repairing an automobile sheet metal panel having a hole therein comprising, thoroughly cleaning the surface of the metal surrounding the hole to provide a clean metal surface, recessing the clean metal surface inwardly of the original contour of the panel at the edge portion of the hole, removing moisture from the clean metal surface, applying a coating of a liquid mixture of catalyzed epoxy resin to the clean dry metal surface, applying a layer of fiberglass cloth to the coated surface, thereafter applying alternate layers of the liquid mixture of the catalyzed epoxy resin and fiberglass cloth until the outer surface of the resultant patch extends outwardly of the original contour of the sheet metal panel, and thereafter abrading the patch after the epoxy resin has set and the patch is substantially firm and able to withstand abrasion to cause the patch to conform to the original contour of the sheet metal panel.

2. A method of repairing an automobile sheet metal panel having a hole therein comprising, thoroughly cleaning the surface of the metal surrounding the hole to provide a clean metal surface, recessing the clean metal surface inwardly of the original contour of the panel at the edge portion of the hole, removing moisture from the clean metal surface, applying a coating of a liquid mixture of catalyzed epoxy resin to the clean dry metal surface, applying a layer of fiberglass cloth to the coated surface and smoothing out the cloth to remove wrinkles and air bubbles, thereafter applying alternate layers of the liquid mixture of catalyzed epoxy resin and layers of fiberglass cloth of successively decreasing size until the outer surface of the resultant patch extends outwardly of the original contour of the sheet metal panel, and thereafter abrading the patch after the epoxy resin has partially set and the patch is substantially firm and able to withstand abrasion to cause the patch to conform to the original contour of the sheet metal panel.

3. A method of repairing an automobile sheet metal panel having an aperture therein comprising, thoroughly cleaning the surface of the metal surrounding the aperture to provide a clean metal surface, recessing the clean metal surface inwardly of the original contour of the panel at the edge portion of the aperture, removing moisture from the clean metal surface, applying a coating of a liquid mixture of catalyzed epoxy resin to the clean dry metal surface and allowing the resin to flow through the aperture to the opposite surface of the panel, applying a layer of fiberglass cloth to the coated clean metal surface and smoothing out the layer to remove wrinkles and air bubbles therefrom and to cause it to conform to the contour of the clean metal surface, thereafter applying alternate layers of the liquid mixture of catalyzed epoxy resin and fiberglass cloth of successively decreasing size until the outer surface of the resultant patch extends outwardly of the original contour of the sheet metal panel, and thereafter abrading the patch to cause the patch to conform to the original contour of the sheet metal panel after the epoxy resin has partially set and provided a substantially firm patch anchored to each surface of the metal panel and able to withstand abrasion.

4. A method of repairing an automobile sheet metal panel having a hole therein comprising, thoroughly cleaning the surface of the metal surrounding the hole to provide a clean metal surface, recessing the clean metal surface inwardly of the original contour of the panel at the edge portion of the hole, providing a series of apertures in the metal panel surrounding the hole in spaced relationship relative thereto, removing moisture from the clean metal surface, applying a coating of a liquid mixture of catalyzed epoxy resin to the clean dry metal surface and forcing the mixture through the series of apertures to the opposite surface of the panel, applying a layer of fiberglass cloth to the coated clean metal surface and smoothing out the layer to remove wrinkles and air bubbles therefrom and cause it to conform to the contour of the clean metal surface, thereafter applying alternate layers of the liquid mixture of the catalyzed epoxy resin and fiberglass cloth until the outer surface of the resultant patch extends outwardly of the original contour of the sheet metal panel, and thereafter abrading the patch to cause it to conform to the original contour of the sheet metal panel after the epoxy resin has partially set and provided a substantially firm patch anchored to each surface of the metal panel and able to withstand abrasion.

5. A method of repairing an automobile sheet metal panel having an aperture therein comprising, thoroughly cleaning one surface of the metal surrounding the aperture to provide a clean metal surface, recessing the clean metal surface inwardly of the original contour of the panel at the edge portion of the aperture, removing moisture from the clean metal surface, applying a coating of a liquid mixture of catalyzed epoxy resin to the clean dry metal surface and to the opposite surface of the metal panel, applying at least one layer of fiberglass cloth to each of the coated surfaces, thereafter applying alternate layers of the liquid mixture of catalyzed epoxy resin and of the fiberglass cloth over the one layer of fiberglass cloth on the coated clean metal surface until the outer surface of the resultant patch extends outwardly of the original contour of the sheet metal panel, and thereafter abrading the patch to cause it to conform to the original contour of the sheet metal panel after the epoxy resin has partially set and bonded the patch to the clean metal surface and to the coated surface and layer of fiberglass cloth on the other surface of the panel to provide a substantially firm patch able to withstand abrasion.

References Cited in the file of this patent

UNITED STATES PATENTS

| | | |
|---|---|---|
| 1,513,204 | White | Oct. 28, 1924 |
| 1,767,421 | Wirth | June 24, 1930 |
| 2,585,115 | Greenlee | Feb. 12, 1952 |
| 2,626,223 | Sattler et al. | Jan. 20, 1953 |
| 2,626,873 | Allen | Jan. 27, 1953 |
| 2,638,961 | Everett | May 19, 1953 |
| 2,651,589 | Shokal et al. | Sept. 8, 1953 |

OTHER REFERENCES

Modern Plastic for February 1952, pages 99, 100, 102, 104 and 106.

Modern Plastics for April 1952, pages 96–99.